US008718014B2

(12) United States Patent
Choi et al.

(10) Patent No.: US 8,718,014 B2
(45) Date of Patent: May 6, 2014

(54) SYSTEM AND METHOD FOR PERFORMING HANDOFF BETWEEN DIFFERENT TYPES OF NETWORKS BY USING A SHORT MESSAGE SERVICE

(75) Inventors: Woo-Jin Choi, Seoul (KR); Eun-Kyoung Paik, Seoul (KR); Seong-Choon Lee, Seoul (KR); Sung-Il Jin, Seoul (KR)

(73) Assignee: KT Corporation, Gyeonggi-do (KR)

( * ) Notice: Subject to any disclaimer, the term of this patent is extended or adjusted under 35 U.S.C. 154(b) by 228 days.

(21) Appl. No.: 13/171,879

(22) Filed: Jun. 29, 2011

(65) Prior Publication Data

US 2011/0317663 A1   Dec. 29, 2011

(30) Foreign Application Priority Data

Jun. 29, 2010   (KR) .................... 10-2010-0062095

(51) Int. Cl.
   *H04W 36/14*   (2009.01)
(52) U.S. Cl.
   USPC .......................................................... 370/331
(58) Field of Classification Search
   USPC .................................. 370/310, 328, 329, 331
   See application file for complete search history.

(56) References Cited

U.S. PATENT DOCUMENTS

| | | | | |
|---|---|---|---|---|
| 7,089,005 | B2 * | 8/2006 | Reddy ............................ | 455/436 |
| 7,149,521 | B2 * | 12/2006 | Sundar et al. ............... | 455/435.1 |
| 7,295,540 | B2 * | 11/2007 | Joong et al. ................... | 370/338 |
| 7,502,615 | B2 * | 3/2009 | Wilhoite et al. .............. | 455/442 |
| 7,761,099 | B2 * | 7/2010 | Kim et al. ..................... | 455/436 |
| 7,894,400 | B2 * | 2/2011 | Rahman et al. ............... | 370/331 |
| 7,899,458 | B2 * | 3/2011 | Kakishima et al. ........... | 455/436 |
| 7,970,399 | B2 * | 6/2011 | Sunderberg et al. .......... | 455/436 |
| 8,010,112 | B1 * | 8/2011 | Delker et al. ................. | 455/437 |
| 8,112,111 | B2 * | 2/2012 | Pettersson et al. ......... | 455/552.1 |
| 8,149,790 | B2 * | 4/2012 | Purkayastha et al. ......... | 370/332 |
| 8,265,601 | B2 * | 9/2012 | Jun ............................ | 455/412.1 |

(Continued)

FOREIGN PATENT DOCUMENTS

| | | |
|---|---|---|
| KR | 10-2011-0105522 A | 9/2011 |
| KR | 10-2011-0105524 A | 9/2011 |

OTHER PUBLICATIONS

Office Action mailed Feb. 28, 2013, for U.S. Appl. No. 13/171,854.

(Continued)

*Primary Examiner* — Chi Pham
*Assistant Examiner* — Robert Lopata
(74) *Attorney, Agent, or Firm* — IP Legal Services, LLC (57) ABSTRACT

A system and method for handing off from a first network to a second network. A determination may be made as to whether an accessible base station of the second network is located in the vicinity of a user equipment based on information on a current location of the user equipment in the first network. An activation message may be generated with a first telephone number as a caller number when an accessible base station of the second network is located in the vicinity of the user equipment based on the determination result. The activation message indicates an initiation of a search for an accessible base station of the second network, and an accessible base station of the second network may be searched for when the activation message with the first telephone number is received. A handoff from the first network to the second network may then be executed when the accessible base station of the second network is located.

20 Claims, 6 Drawing Sheets

(56) References Cited

U.S. PATENT DOCUMENTS

| | | | |
|---|---|---|---|
| 8,331,315 B2* | 12/2012 | Purkayastha et al. | 370/331 |
| 2003/0114158 A1* | 6/2003 | Soderbacka et al. | 455/436 |
| 2004/0023669 A1* | 2/2004 | Reddy | 455/456.1 |
| 2004/0219918 A1* | 11/2004 | Kakishima et al. | 455/436 |
| 2005/0221813 A1* | 10/2005 | Rajahalme et al. | 455/422.1 |
| 2006/0046752 A1* | 3/2006 | Kalavade | 455/466 |
| 2006/0121914 A1 | 6/2006 | Kim et al. | |
| 2006/0246903 A1* | 11/2006 | Kong et al. | 455/437 |
| 2007/0123260 A1* | 5/2007 | Kim et al. | 455/436 |
| 2008/0153462 A1* | 6/2008 | Jun | 455/412.1 |
| 2009/0023446 A1* | 1/2009 | Das | 455/435.2 |
| 2009/0168676 A1* | 7/2009 | Olson | 370/311 |
| 2009/0278705 A1* | 11/2009 | Chhabra et al. | 340/825.49 |
| 2010/0040023 A1 | 2/2010 | Gallagher et al. | |
| 2010/0041403 A1 | 2/2010 | Khetawat et al. | |
| 2010/0240394 A1 | 9/2010 | Yamada et al. | |
| 2010/0273450 A1* | 10/2010 | Papineau et al. | 455/411 |
| 2011/0026484 A1 | 2/2011 | Fox et al. | |

OTHER PUBLICATIONS

Final Rejection mailed Aug. 23, 2013, for U.S. Appl. No. 13/171,854.

* cited by examiner

SYSTEM AND METHOD FOR PERFORMING HANDOFF BETWEEN DIFFERENT TYPES OF NETWORKS BY USING A SHORT MESSAGE SERVICE

CROSS REFERENCE TO PRIOR APPLICATIONS

The present application claims priority under 35 U.S.C. §119 to Korean Patent Application No. 10-2010-0062095 (filed on Jun. 29, 2010), which is hereby incorporated by reference in its entirety.

FIELD OF THE INVENTION

Apparatuses and methods consistent with the present invention relate to a handoff between different types of networks, and more particularly, to effectively searching for an accessible base station using a short message service (SMS) in a handoff between different types of networks.

BACKGROUND OF THE INVENTION

In general, a handoff is a process of transferring a data session from one cell to another without interruption of a related service. The handoff enables a user equipment to seamlessly receive a service even when the user equipment travels from one cell to another. Such a cell-to-cell handoff has been applied to homogenous networks. Lately, handoff has been advanced to transfer a data session between different types of networks.

Handoff between different types of networks, for example, from a mobile network to a wireless data network, is frequently performed to improve a service quality or to reduce a service charge. In order to handoff from a mobile network to a wireless data network, user equipment needs to frequently search accessible wireless data networks in the vicinity of the current location of the user equipment. For example, a user equipment frequently searches for a Wi-Fi service area or a Wi-Fi access point using a Wi-Fi modulator-demodulator (MODEM) in order to handoff from a wideband code division multiple access (WCDMA) network to a Wi-Fi network. Such frequent searching of a Wi-Fi access point significantly increases overall power consumption of the user equipment.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a handoff from a first network to a second network may be initiated when a user equipment receives an activation message.

In accordance with an embodiment of the present invention, a communication session of a user equipment may be handed off from a first network to a second network. A determination may be made as to whether an accessible base station of the second network is located in a vicinity of the user equipment based on information on a current location of the user equipment within the first network. An activation message may be generated with a first telephone number as a caller number when the accessible base station of the second network is determined to be located in the vicinity of the user equipment. The activation message may be transmitted to the user equipment. The user equipment may search for the accessible base station of the second network when the activation message with the first telephone number is received. The handoff from the first network to the second network may be executed when the user equipment finds the accessible base station of the second network and enters a service area of the accessible base station.

In accordance with an embodiment of the present invention, the user equipment may delete a record of receiving the activation message without informing a corresponding user when the user equipment receives the activation message with the first telephone number as the caller number. The searching for the accessible base station of the second network may be repeated by the user equipment at an interval of time.

In accordance with an embodiment of the present invention, an inactivation message may be generated when the user equipment leaves the service area of the accessible base station of the second network, and the inactivation message may be transmitted to the user equipment. The user equipment may stop searching for the accessible base station of the second network when the inactivation message is received. The user equipment may delete a record of receiving the inactivation message without informing a corresponding user when the user equipment receives the inactivation message with the second telephone number as the caller number.

In accordance with an embodiment of the present invention, the information on the current location of the user equipment may be compared with the base station information of registered base stations within the second network in order to determine whether the accessible base station of the second network is located in the vicinity of the user equipment.

In accordance with an embodiment of the present invention, the base station information may be provided from at least one of a home location register (HLR), a home subscriber server (HSS), an IP multimedia subsystem (IMS) based location information server, a media independent server (MIS) as defined in IEEE 802.21, and an access network detection and selection function (ANDSF) as defined in third generation partnership project (3GPP) specifications. The base station information may be provided by users. Furthermore, the base station information may be collected from a network management system.

In accordance with an embodiment of the present invention, the first network may be a mobile network and the second network may be a wireless data network. The first network may be a wideband code division multiple access (WCDMA) network and the second network may be a Wi-Fi network.

In accordance with an embodiment of the present invention, a Wi-Fi modulator-demodulator (MODEM) may be initiated for searching for an accessible Wi-Fi access point of the Wi-Fi network. The user equipment may turn off the Wi-Fi MODEM when the user equipment receives an inactivation message with a second telephone number as the caller number.

In accordance with another embodiment of the present invention, a communication session of a user equipment may be handed off from a first network to a second network. Information on a current location of the user equipment located within the first network may be registered. A unit for searching for an accessible base station of the second network may be initiated when an activation message with a first telephone number as a caller number is received by the user equipment. After initiation of the unit, the handoff from the first network to the second network may be executed when the user equipment finds the accessible base station of the second network and enters a service area of the accessible base station.

In accordance with an embodiment of the present invention, a record of receiving the activation message may be deleted without informing a corresponding user when the user equipment receives the activation message with the first telephone number as the caller number.

In accordance with an embodiment of the present invention, the unit for searching for the accessible base station of the second network may be deleted when the user equipment receives an inactivation message with a second telephone number as the caller number. A record of receiving the inactivation message may be turned off without informing a corresponding user when the user equipment receives the inactivation message with the second telephone number as the caller number.

In accordance with a further embodiment of the present invention, a system may be provided for handing off a communication session from a first network to a second network. The system may include a message server and a user equipment. The message server may be configured to transmit an activation message with a first telephone number as a caller number. The user equipment may be configured to search for an accessible base station of the second network when the activation message with the first telephone number is received. The message server may transmit the activation message with the first telephone number as the caller number when the accessible base station is determined to be within a vicinity of the user equipment. The user equipment may execute the handoff from the first network to the second network when the user equipment finds the accessible base station of the second network and enters a service area of the accessible base station.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below in order to explain the present invention by referring to the figures as examples.

Figure 1:
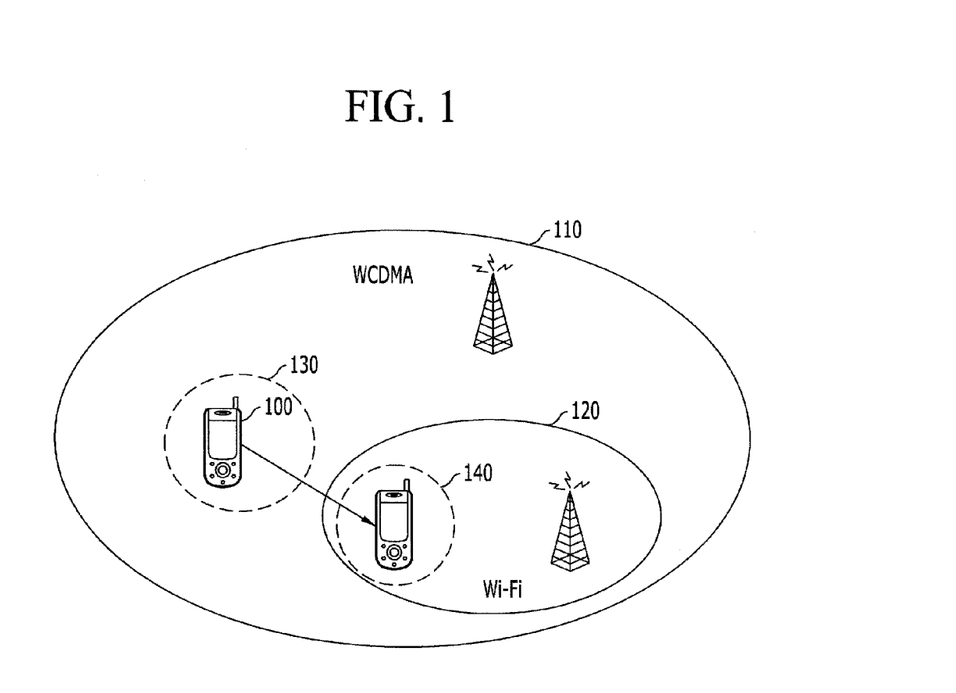
FIG. 1 illustrates a user equipment moving between service areas of different types of networks, in accordance with an embodiment of the present invention.

FIG. 1 illustrates a user equipment 100 moving between service areas of different types of networks.

For convenience and ease of understanding, the user equipment 100 is representatively shown in FIG. 1 as moving from an area serviced only by a wideband code division multiple access (WCDMA) network 110 to an area also serviced by a Wi-Fi network 120. The WCDMA network 110 and the Wi-Fi network 120 are examples of a mobile network and a wireless data network respectively, and are illustrated in FIG. 1 as having the particular configuration shown as an example only, and the present invention is not limited thereto. A system in accordance with an embodiment of the present invention may include a plurality of types of networks in any configuration of service areas, so long as the user equipment 100 initially communicating with a first network of a first network type may be handed off to a second network of a second network type when the user equipment 100 enters the service area of the second network. The first network type and the second network type may each be any type of communication network or standard, so long as the first network type and the second network type are not the same.

Referring to FIG. 1, a user equipment 100 may move from a first location 130 within the WCDMA network 110 to a second location 140 within the Wi-Fi network 120. In order to handoff from the WCDMA network 110 to the Wi-Fi network 120, the user equipment 100 may initiate a Wi-Fi modulator-demodulator (MODEM) and search for an accessible Wi-Fi access point in the vicinity of the user equipment 100. In this particular embodiment of the present invention, the first network is the WCDMA network and the second network is the Wi-Fi network 120. However, in other embodiments of the present invention, the first network may instead be a Long Term Evolution (LTE) network, a Wi-Fi network, or any other type of mobile network or wireless data network. Also, the second network may instead be a WiMAX network in which case a WiMAX MODEM may be initiated and an accessible WiMAX access point may be searched for, or a GSM network in which case a GSM MODEM may be initiated and an accessible GSM access point may be searched for. However, the first network of the present invention is not limited to WCDMA, LTE and Wi-Fi networks, and the second network of the present invention is not limited to Wi-Fi, WiMAX and GSM networks, and as discussed above, the first and second networks may each be any type of communication network or standard, so long as the first network type and the second network type are not the same. Accordingly, the MODEM and the accessible access point associated with the second network would be of types corresponding to the type of communication network or standard of the second network.

Figure 2:
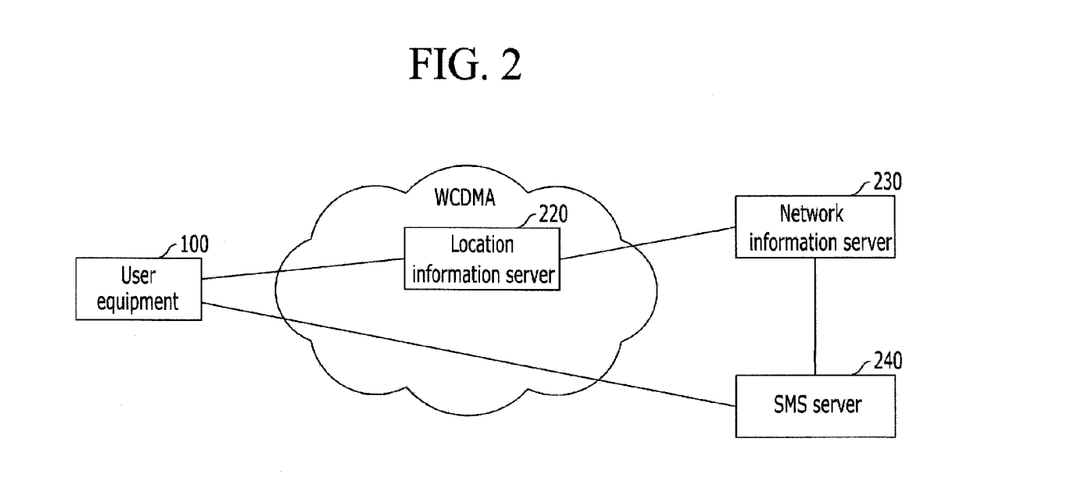
FIG. 2 illustrates a system for handoff between different types of networks, in accordance with an embodiment of the present invention.

FIG. 2 illustrates a system for handoff between different types of networks, in accordance with an embodiment of the present invention.

Referring to FIG. 2, the system may include a user equipment 100, a location information server 220, a network information server 230, and a short message service (SMS) server 240. The user equipment 100, the location information server 220, the network information server 230, and the SMS server 240 may communicate with each other through wired and/or wireless networks.

The user equipment 100 may be a digital device capable of transmitting and receiving a call and a message. For example, the user equipment 100 may be a cellular phone, a personal digital assistant (PDA), or a laptop computer, but is not limited thereto.

The user equipment 100 may initiate a Wi-Fi MODEM when receiving an activation message. The activation message may be an SMS message transmitted with a first telephone number as a caller number. The first telephone number may be a specific telephone number set to invoke the user equipment 100 to start searching for an accessible Wi-Fi access point. For example, the first telephone number may be 000-000-0000. When the user equipment 100 receives an SMS message from the first telephone number, the user equipment 100 may initiate a Wi-Fi MODEM and start searching for a Wi-Fi access point in the vicinity of the user equipment 100. After finding an accessible Wi-Fi access point, the user equipment 100 may perform a handoff to the accessible Wi-Fi access point. Furthermore, the user equipment 100 may turn off the Wi-Fi MODEM when the user equipment 100 receives an inactivation message. The inactivation message may be an SMS message received with a second telephone number as a caller number. The second telephone number may be a specific telephone number set to invoke the user equipment to terminate searching for an accessible Wi-Fi access point. For example, the second telephone number may be 111-111-1111.

The location information server 220 may store information on a current location of the user equipment 100. The location information server 220 may provide the stored location information of the user equipment 100 to the network information server 230. For example, the location information server 220 may be a home location register (HLR), a home subscriber server (HSS), or an IP multimedia subsystem (IMS) based location server, a media independent server (MIS) as defined in IEEE 802.21, or an access network detection and selection function (ANDSF) as defined in third generation partnership project (3GPP) specifications, but is not limited thereto.

The network information server 230 may store base station information of base stations of a target network. The target network may be any network to which a handoff may be made. The base station information may include information on locations of base stations of the target network. For example, in the event of the second network being a Wi-Fi network, the network information server 230 may store Wi-Fi information of Wi-Fi access points. The Wi-Fi information may include information on locations of Wi-Fi access points. The network information server 230 may collect Wi-Fi information from a network management system (NMS). Further, users may directly input Wi-Fi information of Wi-Fi access points to the network information server 230. The network information server 230 may determine whether Wi-Fi access points are in the vicinity of the user equipment 100 based on the location information of the user equipment 100 stored by the location information server 220 and the Wi-Fi information of the Wi-Fi access points stored by the network information server 230.

When the network information server 230 determines that an accessible Wi-Fi access point is located in the vicinity of the user equipment 100, the network information server 230 may transmit a first trigger signal to the SMS server 240. The first trigger signal may instruct the SMS server 240 to transmit the activation message with the first telephone number as the caller number to the user equipment 100.

When the network information server 230 determines that the user equipment 100 leaves a Wi-Fi service area, the network information server 230 may transmit a second trigger signal to the SMS server 240. The second trigger signal may instruct the SMS server 240 to transmit the inactivation message with the second telephone number as the caller number to the user equipment 100. In addition, the network information server 230 may request the user equipment 100 to provide location information of the user equipment 100.

The SMS server 240 may transmit either the activation message with the first telephone number or the inactivation message with the second telephone number as the caller number when the first trigger signal and the second trigger signal respectively are received from the network information server 230.

As described above, in an embodiment of the present invention, the activation message or the inactivation message may be provided to the user equipment 100 to initiate or interrupt the searching for an accessible Wi-Fi access point. Accordingly, the user equipment 100 may effectively search for an accessible Wi-Fi access point to handoff in a heterogeneous network environment having WCDMA and Wi-Fi networks.

Figure 3:
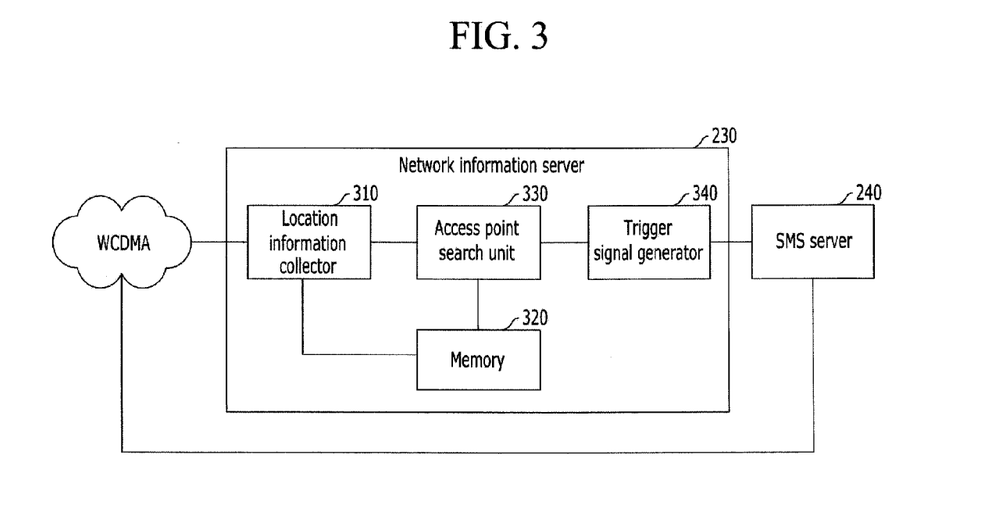
FIG. 3 illustrates in more detail the network information server of FIG. 2, in accordance with an embodiment of the present invention.

FIG. 3 illustrates in more detail the network information server 230 of FIG. 2, in accordance with an embodiment of the present invention.

Referring to FIG. 3, the network information server 230 may include a location information collector 310, a memory 320, an access point search unit 330, and a trigger signal generator 340.

The location information collector 310 may collect information on a current location of the user equipment 100 from the location information server 220.

The memory 320 may store Wi-Fi information of Wi-Fi access points accessible from the user equipment 100. The Wi-Fi information of Wi-Fi access points may be obtained directly from users. Furthermore, the Wi-Fi information of Wi-Fi access points may be collected from the network management system (NMS) that manages corresponding Wi-Fi networks. For example, IEEE 802.21 may define functions and messages for providing user equipment with information on the networks in the vicinity of a current location of the user equipment in media independent handover (MIH). The network information server 230 may obtain the information on the networks in the vicinity from functions and messages of MIH and store the obtained information in the memory 320. The memory 320 may be a nonvolatile memory such as a cache, a read only memory (ROM), a programmable ROM (PROM), an electrically erasable programmable ROM (EPROM), a flash memory, and a hard disk drive, or a volatile memory such as a random access memory (RAM), but is not limited thereto.

The access point search unit 330 may determine whether accessible Wi-Fi access points are in the vicinity of the user equipment 100. In order to make this determination, the access point search unit 330 may analyze information on the current location of the user equipment 100 collected by the location information collector 310 and the Wi-Fi information stored in the memory 320.

The trigger signal generator 340 may generate a trigger signal based on a determination result of the access point search unit 330. For example, the trigger signal generator 340 may generate a first trigger signal when the access point search unit 330 determines that an accessible Wi-Fi access point is located in the vicinity of the user equipment 100. Further, the trigger signal generator 340 may generate a second trigger signal when the network information server 230 determines that the user equipment 100 leaves a Wi-Fi service area of a corresponding Wi-Fi access point.

Figure 4:
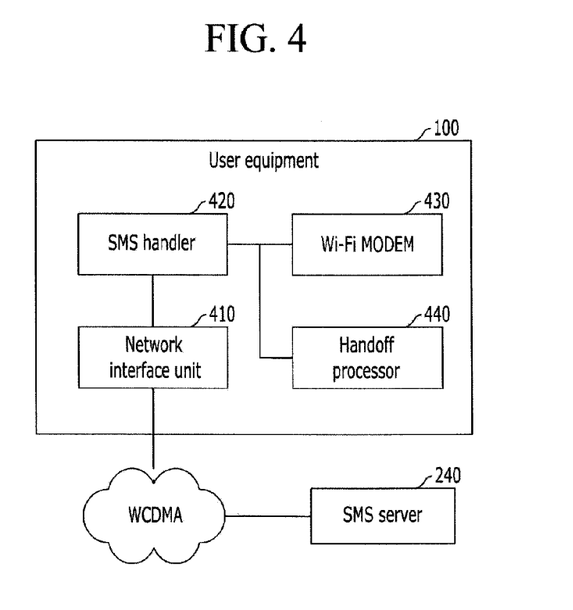
FIG. 4 illustrates in more detail the user equipment of FIG. 2, in accordance with an embodiment of the present invention.

FIG. 4 illustrates in more detail the user equipment 100 of FIG. 2, in accordance with an embodiment of the present invention.

Referring to FIG. 4, the user equipment 100 may include a network interface unit 410, an SMS handler 420, a Wi-Fi MODEM 430, and a handoff processor 440.

The network interface unit 410 may receive a message through a mobile network such as the WCDMA network or a wireless data network such as the Wi-Fi network, but is not limited thereto. For example, in an embodiment of the present invention, the network interface unit 410 may receive an activation message or an inactivation message from the SMS server 240 through the WCDMA network.

The SMS handler 420 may determine whether or not the received message is an activation message. In order to determine whether or not the received message is an activation message, the SMS handler 420 may compare a caller number of the received message with stored numbers. When the caller number of the received message is the first telephone number, the SMS handler 420 determines that the received message is the activation message. As described above, the first telephone number may be a specific telephone number set to invoke the user equipment 100 to initiate the Wi-Fi MODEM 430. For example, the first telephone number may be 000-000-0000. Furthermore, the SMS handler 420 may delete a record of a received message from a message log without informing a corresponding user of the received message when the received message is the activation message.

The SMS handler 420 may determine whether or not the received message is an inactivation message. In order to determine whether the received message is an inactivation message, the SMS handler 420 may compare a caller number of the received message with stored numbers. When the caller number of the received message is the second telephone number, the SMS handler 420 determines that the received message is the inactivation message. As described above, the second telephone number may be a specific telephone number set to invoke the user equipment 100 to interrupt the Wi-Fi MODEM 430. For example, the second telephone number may be 111-111-1111. Furthermore, the SMS handler 420 may delete a record of a received message from a message log without informing a corresponding user of the received message when the received message is the inactivation message.

The SMS handler 420 may control the Wi-Fi MODEM 430 according to the received message. For example, when the SMS handler 420 determines that the received message is the activation message, the SMS handler 420 may initiate the Wi-Fi MODEM 430. When the SMS handler 420 determines that the received message is the inactivation message, the SMS handler 420 may turn off the Wi-Fi MODEM 430.

The Wi-Fi MODEM 430 may be controlled by the SMS handler 420. For example, the Wi-Fi MODEM 430 may be turned on when the SMS handler 420 determines that the received message is the activation message. In this case, the Wi-Fi MODEM 430 may start searching for an accessible Wi-Fi access point in the vicinity of the user equipment 100. When the Wi-Fi MODEM 430 finds an accessible Wi-Fi access point in the vicinity of the user equipment 100, the handoff processor 440 may perform a handoff from the WCDMA network to a Wi-Fi network corresponding to the found Wi-Fi access point.

Figure 5:
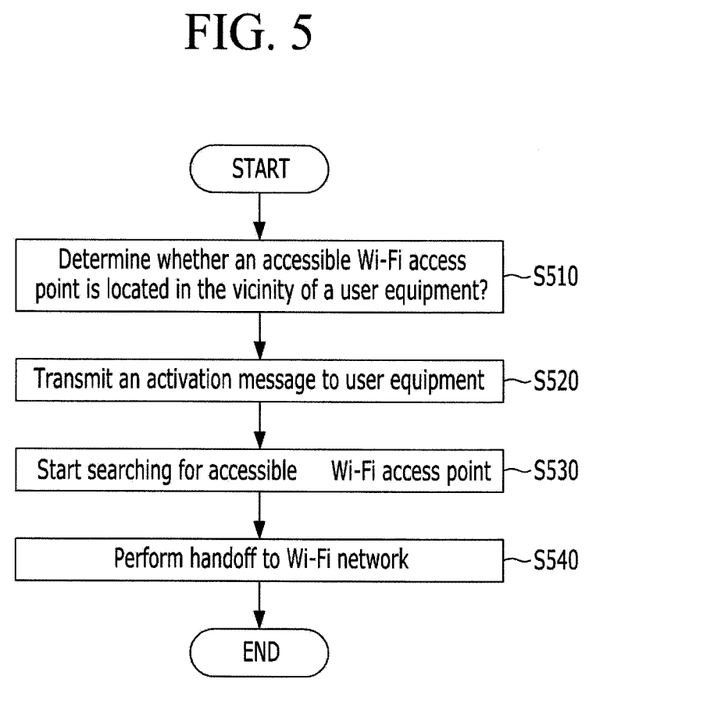
FIG. 5 illustrates a method for handoff between different types of networks, in accordance with an embodiment of the present invention.

FIG. 5 illustrates a method for handoff between different types of networks, in accordance with an embodiment of the present invention.

For convenience and ease of understanding, a WCDMA network and a Wi-Fi network are representatively shown in FIG. 5 as examples of a mobile network and a wireless data network. The present invention, however, is not limited thereto.

Referring to FIG. 5, a determination may be made as to whether an accessible Wi-Fi access point is located in the vicinity of a user equipment 100 S510. Again, the second network is represented in FIG. 5 for example as a Wi-Fi network. As discussed above, the first network type and the second network type may each be any type of communication network or standard, so long as the first network type and the second network type are not the same.

The network information server 230 may collect information on a current location of the user equipment 100 from the location information server 220. The network information server 230 may determine whether an accessible Wi-Fi access point is located in the vicinity of the user equipment 100 based on the collected location information and the Wi-Fi information stored in the network information server 230.

An activation message may be transmitted to the user equipment 100 S520. For example, when the network information server 230 determines that an accessible Wi-Fi access point is located in the vicinity of the user equipment 100, the SMS server 240 may transmit the activation message to the user equipment 100. The activation message may be an SMS message transmitted with a first telephone number as a caller number. The first telephone number may be a specific number that invokes the user equipment 100 to initiate or turn on the Wi-Fi MODEM 430. When the user equipment 100 leaves a corresponding Wi-Fi service area after the user equipment 100 receives the activation message, an inactivation message may be transmitted to the user equipment 100. The inactivation message may be an SMS message transmitted with a second telephone number as the caller number. The second telephone number may be a specific number that invokes the user equipment 100 to turn off the Wi-Fi MODEM 430.

An accessible Wi-Fi access point is searched for when the user equipment 100 receives the activation message S530. For example, the user equipment 100 may initiate the Wi-Fi MODEM 430 and start searching for an accessible Wi-Fi access point near the user equipment 100 when the user equipment 100 receives the activation message associated with the first telephone number as the caller number. Furthermore, the user equipment 100 may turn off the Wi-Fi MODEM when the user equipment 100 receives the inactivation message associated with the second telephone number as the caller number.

When the Wi-Fi MODEM 430 finds an accessible Wi-Fi access point in the vicinity of the user equipment 100, a handoff is performed from the WCDMA network to the Wi-Fi network S540.

Figure 6:
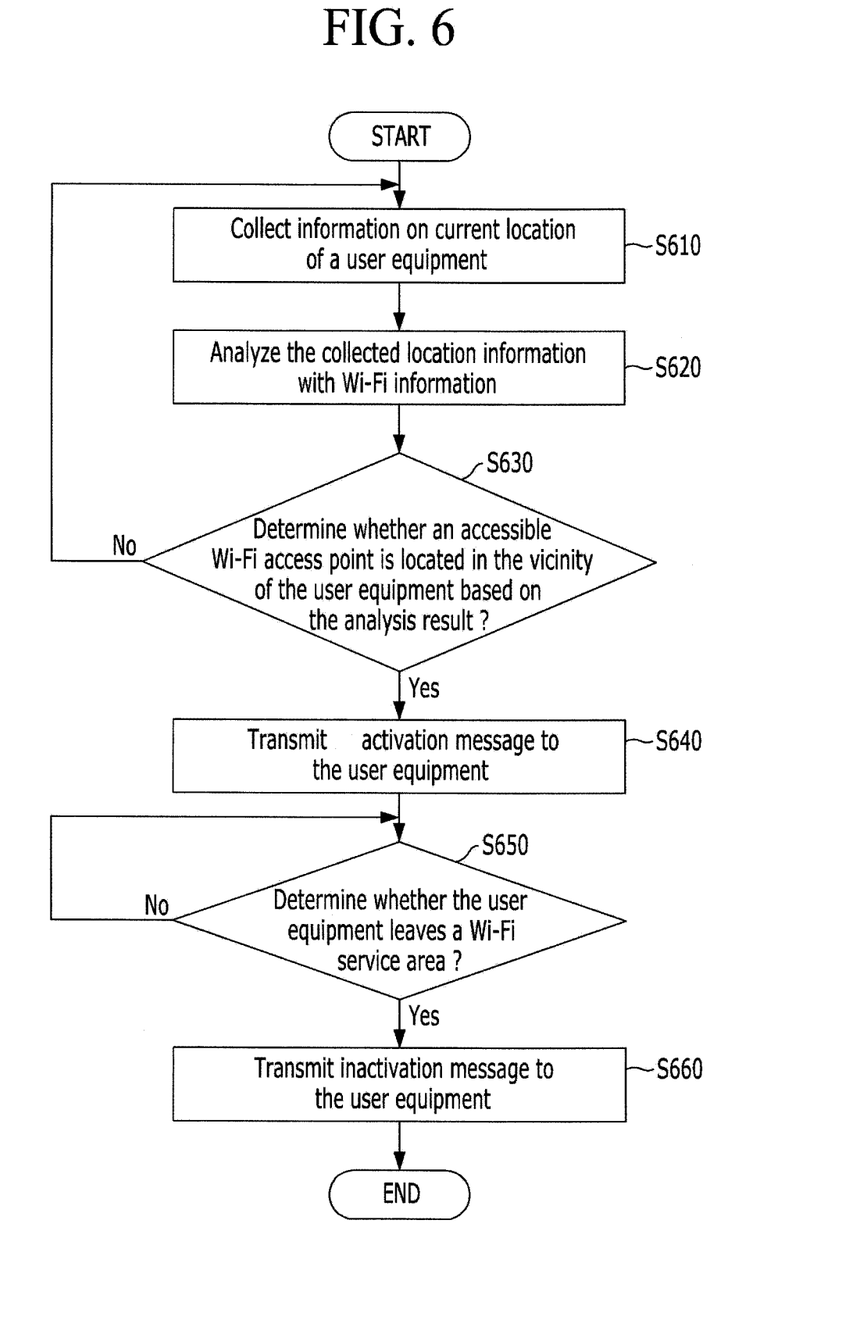
FIG. 6 illustrates a method of transmitting a message for initiating a handoff procedure between different types of networks, in accordance with an embodiment of the present invention.

FIG. 6 illustrates a method of transmitting a message for initiating a handoff procedure between different types of networks, in accordance with an embodiment of the present invention.

Referring to FIG. 6, information on a current location of a user equipment 100 is collected S610. For example, the user equipment 100 may register a current location at the location information server 220 and the location information collector 310 may collect information on the current location of the user equipment 100.

The collected location information of the user equipment 100 may be analyzed with Wi-Fi information S620. For example, the access point search unit 330 may compare the collected location information of the user equipment 100 with Wi-Fi information stored in the memory 320. The Wi-Fi information may include information on locations of Wi-Fi access points. The Wi-Fi information may be collected from the NMS or input directly from users.

A determination may be made as to whether an accessible Wi-Fi access point is located in the vicinity of the user equipment 100 based on the analysis result S630.

When an accessible Wi-Fi access point is located in the vicinity of the user equipment 100 based on the determination result (S630—Yes), an activation message may be transmitted to the user equipment 100 S640. For example, the trigger signal generator 340 may generate a first trigger signal when the access point search unit 330 determines that the accessible Wi-Fi access point is located in the vicinity of the user equipment 100. The trigger signal generator 340 may transmit the first trigger signal to the SMS server 240. The SMS server 240 may generate and transmit an activation message to the user equipment 100. The activation message may be an SMS message transmitted with a first telephone number as the caller number. The first telephone number may be a specific telephone number set to invoke the user equipment to start searching for a Wi-Fi access point.

A determination may be made as to whether the user equipment 100 leaves a Wi-Fi service area of a Wi-Fi access point after transmitting the activation message S650.

When it is determined that the user equipment 100 leaves a Wi-Fi service area (S650—Yes), an inactivation message may be generated and transmitted to the user equipment 100 S660. For example, the trigger signal generator 340 may generate a second trigger signal when the user equipment 100 leaves the Wi-Fi service area after transmitting the activation message. The trigger signal generator 340 may transmit the second trigger signal to the SMS server 240. The SMS server 240 may generate and transmit an inactivation message to the user equipment 100. The inactivation message may be an SMS message transmitted with a second telephone number as the caller number. The second telephone number may be a specific telephone number set to invoke the user equipment to turn off the Wi-Fi MODEM 430.

Hereinafter, a handoff from a WCDMA network to a Wi-Fi network performed by a user equipment 100 will be described with reference to FIG. 7.

Figure 7:
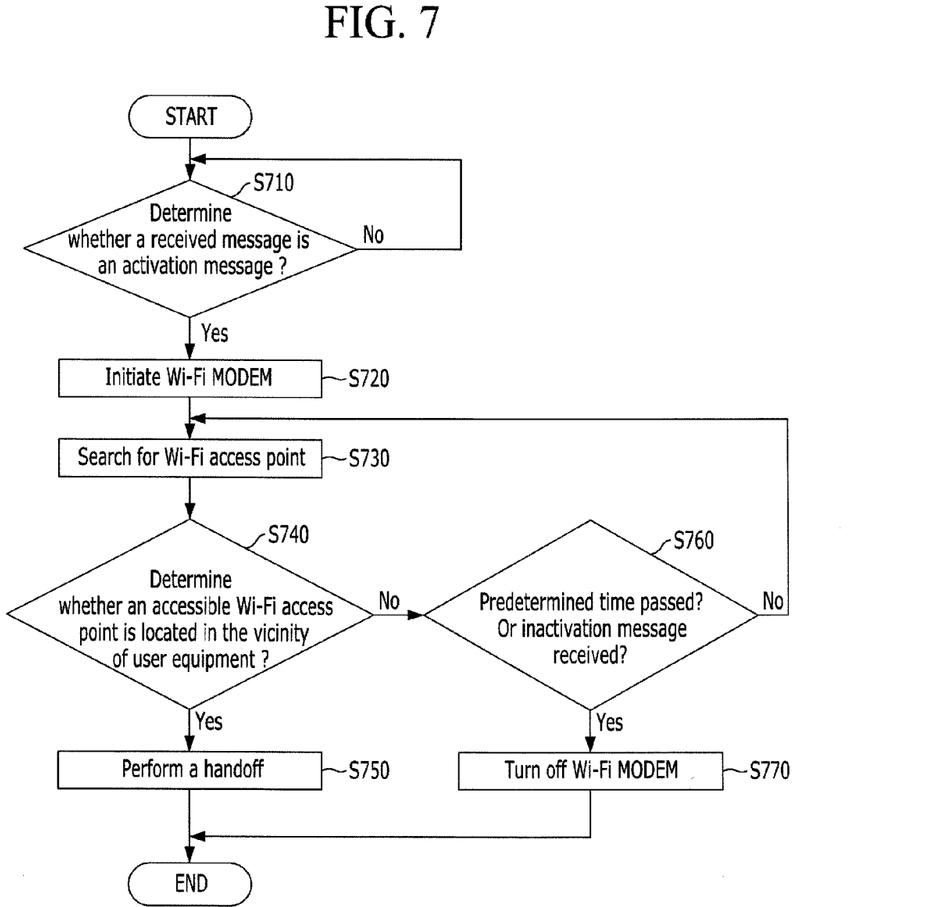
FIG. 7 illustrates a method for executing a handoff by a user equipment between different types of networks, in accordance with an embodiment of the present invention.

FIG. 7 illustrates a method for executing a handoff by a user equipment between different types of networks, in accordance with an embodiment of the present invention.

Referring to FIG. 7, a determination may be made as to whether or not a received message is an activation message S710. For example, when the user equipment 100 receives a message, the user equipment 100 may determine whether or not the received message is an activation message based on a caller number. If the caller number is the first telephone number, the user equipment 100 may determine that the received message is the activation message for initiating the Wi-Fi MODEM 430. Such an activation message may be received through the network interface unit 410 of the user equipment 100. The activation message may be transmitted through a circuit-switched voice service or a voice over Internet Protocol (VoIP) service. The SMS handler 420 may determine whether or not a caller number of the received message is the first telephone number.

The Wi-Fi MODEM 430 may be initiated S720 when the received message is determined to be an activation message (S710—Yes), that is, when the caller number of the received message is the first telephone number. For example, the SMS handler 420 may determine that the caller number of the received message is the first telephone number. In this case, the SMS handler 420 may initiate the Wi-Fi MODEM 430 S720. Furthermore, the SMS handler 420 may delete a record of a received message from a message log without informing a corresponding user of the received message.

A Wi-Fi access point in the vicinity of the user equipment 100 may be searched for through the Wi-Fi MODEM 430 S730. A determination may then be made as to whether an accessible Wi-Fi access point is located in the vicinity of the user equipment based on a result of the searching S740.

When an accessible Wi-Fi access point is located in the vicinity of the user equipment 100 (S740—Yes), a handoff from the WCDMA network to the Wi-Fi network may be performed S750.

When an accessible Wi-Fi access point is not located in the vicinity of the user equipment 100 S740, a determination may be made as to whether searching has been performed for a given duration of time or an inactivation message has been received S760. Accordingly, the searching for an accessible Wi-Fi access point may be performed repeatedly at given time intervals. When a specified length of time has passed or an inactivation message is received while searching for an accessible Wi-Fi access point (S760—Yes), the user equipment 100 may turn off the Wi-Fi MODEM 430 S770. The SMS handler 420 may delete a record of the received inactivation message from a message log without informing a corresponding user of the received inactivation message.

Figure 8:
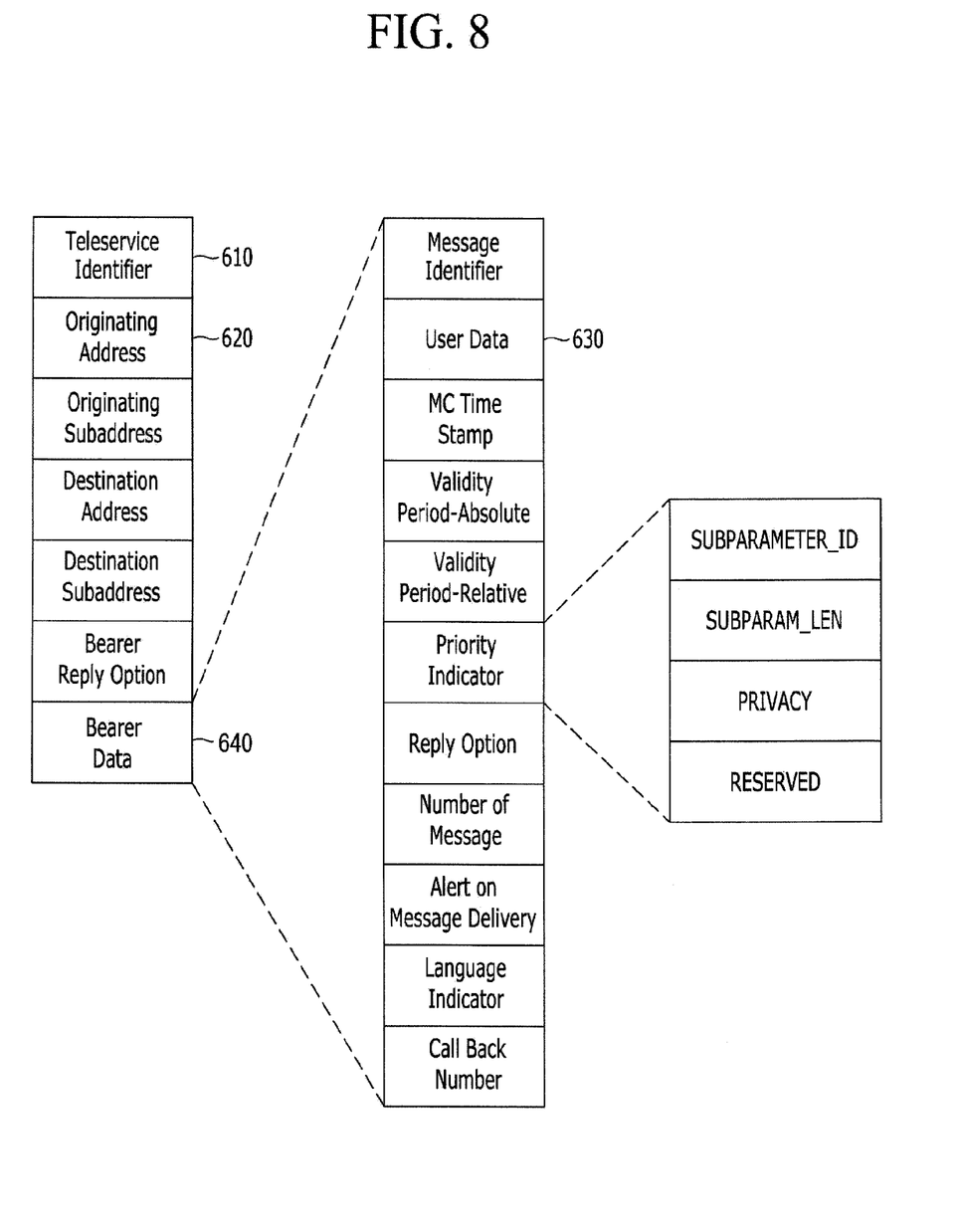
FIG. 8 illustrates a format of a short message service (SMS) message, in accordance with an embodiment of the present invention.

FIG. 8 illustrates a format of an SMS message, in accordance with an embodiment of the present invention.

An SMS message in accordance with an embodiment of the present invention may be a message that instructs a user equipment 100 to start or stop searching for an accessible wireless base station or access point in the vicinity of the user equipment 100. For example, an activation message may invoke the user equipment 100 to start searching for an accessible Wi-Fi access point in the vicinity of the user equipment 100. The activation message may be transmitted with a first telephone number as a caller number. An inactivation message may invoke the user equipment 100 to stop searching for an accessible Wi-Fi access point in the vicinity of the user equipment 100. The inactivation message may be transmitted with a second telephone number as a caller number. That is, the activation and inactivation messages may each include a caller number. Accordingly, the user equipment 100 may initiate searching for an accessible Wi-Fi access point when the user equipment 100 receives the activation message or terminate searching for an accessible Wi-Fi access point when the user equipment 100 receives the inactivation message.

In another embodiment of the present invention, the activation and inactivation messages may each include information on locations and priorities of accessible wireless base stations or access points. In this case, the user equipment 100 may easily search for accessible wireless base stations or access points based on the information included in the activation and inactivation messages. For example, activation and inactivation messages in accordance with an embodiment of the present invention may include a teleservice identifier field 610, an originating address field 620, or a user data field 630 of a bearer data field 640. The information on locations and priorities may be recorded in the teleservice identifier field 610, the originating address field 620, or the user data field 630 of the bearer data field 640. The present invention, however, is not limited thereto.

Accordingly, in an embodiment of the present invention, the user equipment 100 may initiate or interrupt a searching for an accessible base station of a target network, to which a handoff may be made, according to a message received using a typical short message service.

In accordance with embodiments of the present invention, the method for a handoff between different types of networks may be realized as a program and stored in a computer-readable recording medium such as a CD-ROM, a RAM, a ROM, floppy disks, hard disks, magneto-optical disks, and the like. Since the process can be easily implemented by those skilled in the art to which the present invention pertains, further description will not be provided herein.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for handing off a communication session of a user equipment from a first network to a second network, the method comprising;
    Determining, by a network information server in the first network, whether an accessible base station of the second network is located in a vicinity of the user equipment based on information on a current location of the user equipment within the first network;
    generating, by the network information server in the first network, a trigger signal when the network information server determines the accessible base station of the second network is located in the vicinity of the user equipment;
    transmitting, by the network information server in the first network, the trigger signal to a call transmitting server;
    generating, by the call transmitting server, when the trigger signal is received, an activation message with a first telephone number as a caller number when the accessible base station of the second network is determined to be located in the vicinity of the user equipment, wherein the activation message is a short message service (SMS) message;
    transmitting the generated activation message to the user equipment;
    searching, by the user equipment, for the accessible base station of the second network when the activation message with the first telephone number is received by the user equipment; and
    executing the handoff from the first network to the second network when the user equipment finds the accessible base station of the second network and enters a service area of the accessible base station.

2. The method of claim 1, wherein the user equipment deletes a record of receiving the activation message without informing a corresponding user when the user equipment receives the activation message with the first telephone number as the caller number.

3. The method of claim 1, wherein the searching for the accessible base station of the second network is repeated by the user equipment at an interval of time.

4. The method of claim 1, further comprising:
    generating an inactivation message when the user equipment leaves the service area of the accessible base station of the second network; and
    transmitting the generated inactivation message to the user equipment,
    wherein the inactivation message is a short message service (SMS) message assigned with a second telephone number as a caller number, which is different from the first telephone number.

5. The method of claim 4, wherein the user equipment stops searching for the accessible base station of the second network when the inactivation message is received.

6. The method of claim 5, wherein the user equipment deletes a record of receiving the inactivation message without informing a corresponding user when the user equipment receives the inactivation message with the second telephone number as the caller number.

7. The method of claim 1, wherein the determining whether the accessible base station of the second network is located in the vicinity of the user equipment comprises comparing the information on the current location of the user equipment with base station information of registered base stations within the second network.

8. The method of claim 7, wherein the base station information is provided from at least one of a home location register (HLR), a home subscriber server (HSS), an IP multimedia subsystem (IMS) based location information server, a media independent server (MIS) as defined in IEEE 802.21, and an access network detection and selection function (ANDSF) as defined in third generation partnership project (3GPP) specifications.

9. The method of claim 7, wherein the base station information is provided by users.

10. The method of claim 7, wherein the base station information is collected from a network management system.

11. The method of claim 1, wherein the first network is a mobile network and the second network is a wireless data network.

12. The method of claim 1, wherein the first network is a wideband code division multiple access (WCDMA) network and the second network is a Wi-Fi network.

13. The method of claim 12, wherein the searching for the accessible base station of the second network comprises initiating a Wi-Fi modulator-demodulator (MODEM) for searching for an accessible Wi-Fi access point of the Wi-Fi network.

14. The method of claim 13, wherein the user equipment turns off the Wi-Fi MODEM when the user equipment receives an inactivation message with a second telephone number as the caller number, which is different from the first telephone number.

15. A method for handing off a communication session of a user equipment from a first network to a second network, the method comprising:
    registering information on a current location of the user equipment located within the first network;
    initiating a processor for searching for an accessible base station of the second network when an activation message with a first telephone number as a caller number is received by the user equipment, wherein the activation message is a short message service (SMS) message, wherein the activation message is generated by a call transmitting server when a network information server in the first network determines that an accessible base station of the second network is located within a vicinity of the user equipment; and executing the handoff from the first network to the second network when the user equipment finds the accessible base station of the second network and enters a service area of the accessible base station, wherein the step of the initiating includes the steps of:
- generating, by the network information server in the first network, a trigger signal when the network information server determines the accessible base station of the second network is located in the vicinity of the user equipment;
- transmitting, by the network information server in the first network, the trigger signal to the call transmitting server; and
- generating and transmitting, by the call transmitting server, when the trigger signal is received, the activation message.

16. The method of claim 15, further comprising:
deleting a record of receiving the activation message without informing a corresponding user when the user equipment receives the activation message with the first telephone number as the caller number.

17. The method of claim 15, further comprising;
turning off the processor for searching for the accessible base station of the second network when the user equipment receives an inactivation message with a second telephone number as the caller number, wherein the inactivation message is a short message service (MSM) message and the second telephone number is different from the first telephone number.

18. The method of claim 17, further comprising;
deleting a record of receiving the inactivation message without informing a corresponding user when the user equipment receives the inactivation message with the second telephone number as the caller number.

19. The method of claim 15, wherein the first network is a mobile network and the second network is a wireless data network, and the user equipment comprises an interface unit for accessing the first network and the second network.

20. A system for handing off a communication session from a first network to a second network, the system comprising;
- a message server configured to transmit an activation message with a first telephone number as a caller number, wherein the activate message is a short message service (SMS) message;
- a user equipment configured to search for an accessible base station of the second network when the activation message with the first telephone number is received; and
- an information server in the first network configured to determine whether an accessible base station of the second network is located within a vicinity of the user equipment,
wherein the message server transmits the activation message with the first telephone number as the caller number when the accessible base station is determined to be within a vicinity of the user equipment,
wherein the information server in the first network is configured to generate a trigger signal when the accessible base station of the second network is determined to be within the vicinity of the user equipment, and transmit the trigger signal to the message server,
wherein the message server generates and transmits the activation message when the trigger signal is received, and
wherein the user equipment executes the handoff from the first network to the second network when the user equipment finds the accessible base station of the second network and enters a service area of the accessible base station.

* * * * *